May 25, 1948.　　　F. W. MEREDITH ET AL　　　2,442,308
METHOD AND APPARATUS FOR BALANCING ROTORS
Filed March 1, 1944　　　5 Sheets-Sheet 1

Patented May 25, 1948

2,442,308

UNITED STATES PATENT OFFICE 2,442,308

METHOD AND APPARATUS FOR BALANCING ROTORS

Frederick William Meredith, Eric Beecroft Moss, and Hubert Edward Whatley, Cricklewood, London, England, assignors to S. Smith & Sons (England) Limited, a British company Application March 1, 1944, Serial No. 524,652
In Great Britain October 19, 1943

11 Claims. (Cl. 73—66)

This invention relates to balanced rotors and particularly to rotors employed for gyroscopic apparatus, such as artificial horizons for aircraft and has for an object to provide a simple and accurate method of producing a rotor which is dynamically balanced.

According to this invention, there is provided a rotor which has been balanced by successively applying unbalancing forces of similar value and sense on opposite sides of the spin axis of the rotor, by rotating the rotor through a given range of speed and comparing the out-of-balance reactions set up by the rotor at a given speed after each unbalancing force has been applied, by removing and/or adding material from or to the rotor at the points of application of the unbalancing forces and by again comparing the reaction and if necessary removing and adding material until the resulting out-of-balance reactions are the same. Preferably, two such balancing operations are carried out, one by applying successively unbalancing forces to two points on opposite sides of the spin axis on a line passing through that axis and the second by successively applying unbalancing forces to two other points of the rotor on a line transverse to the first said line and passing through the axis. By arranging the two lines to be at right-angles to one another balancing about one axis can be effected without influencing the balance about the other axis at right-angles thereto. Balancing is thus effected first in the plane of one face of the rotor and is then repeated in respect of the other face.

Unbalancing forces of similar value are preferably obtained by so arranging said points as to be disposed at equal distances from the axis of spin and by applying equal loads successively to these points. For example, the loading may be effected by applying a mass successively to points on a side face of the rotor.

The invention includes within its scope a method of balancing a rotor which consists in dynamically balancing the rotor about each of two axes at right-angles to one another and to the axis of spin.

The out-of-balance reactions may be measured by recording the extent of deflection of the mounting for the rotor, which mounting may comprise a frame resiliently carried by a support so as to be movable in a direction transverse to the rotor axis. In such an arrangement, the rotor is rotated through a range of speeds including a speed corresponding to the natural period of vibration of the resiliently mounted system, whereby resonance of the frame is set up and under these conditions the amplitude of vibration is a measure of the out-of-balance reaction.

The frame may be arranged to oscillate about an axis at right-angles to that of the rotor.

In such an arrangement the axis of oscillation may be arranged in the plane of one face of the rotor while the aforesaid unbalancing forces are successively applied to points on the opposite face, the material being removed from and/or added to the latter face until the maximum deflection of the frame is the same for each application of the unbalancing force, whereafter the position of the rotor is reversed in the frame and a similar procedure is followed with respect to the other face. Thus, complete balancing can be obtained of the rotor in two planes passing through the two faces.

The amplitude of vibration of the frame may be measured by arranging the frame to operate a magnetic pick-up which generates an electric current proportional to said amplitude and which pick-up is connected in circuit with an appropriate indicating or recording instrument. Preferably, filters are associated with the circuit so as to filter out any unwanted vibrations, such as those generated in the bearings and transmitted to the magnetic pick-up, or those generated by the mechanism driving the rotor. Preferably, the filtered vibrations set up by the resilient frame are amplified before being passed to the indicator.

As indicated above, the rotor requires to be rotated up to or slightly beyond the speed corresponding to the natural period of vibration of the resilient system; also, as indicated above, the driving mechanism of the rotor may set up vibrations. The periodicity of such vibrations will be proportional to the speed and will usually be within the audio-frequency range. This is particularly the case where a rotor is driven by an air jet impinging on buckets, or the like, on the periphery of the rotor, which results in a high pitch whistle being generated, the frequency of which is proportional to the speed and number of buckets. The speed of the rotor may be automatically governed at, or just beyond, the speed corresponding to the frame resonance by providing means such as a microphone responsive to said whistle so as to produce a current having a frequency proportional to the rotor speed, which current is passed through a circuit having a filter sharply tuned to the bucket or whistle frequency, and by arranging the current passed by the filter to operate a relay to cut off the source of supply for driving the rotor.

The following is a description of one form of apparatus suitable for balancing the rotor of a gyroscope, reference being made to the accompanying drawing, in which.

Figure 1:
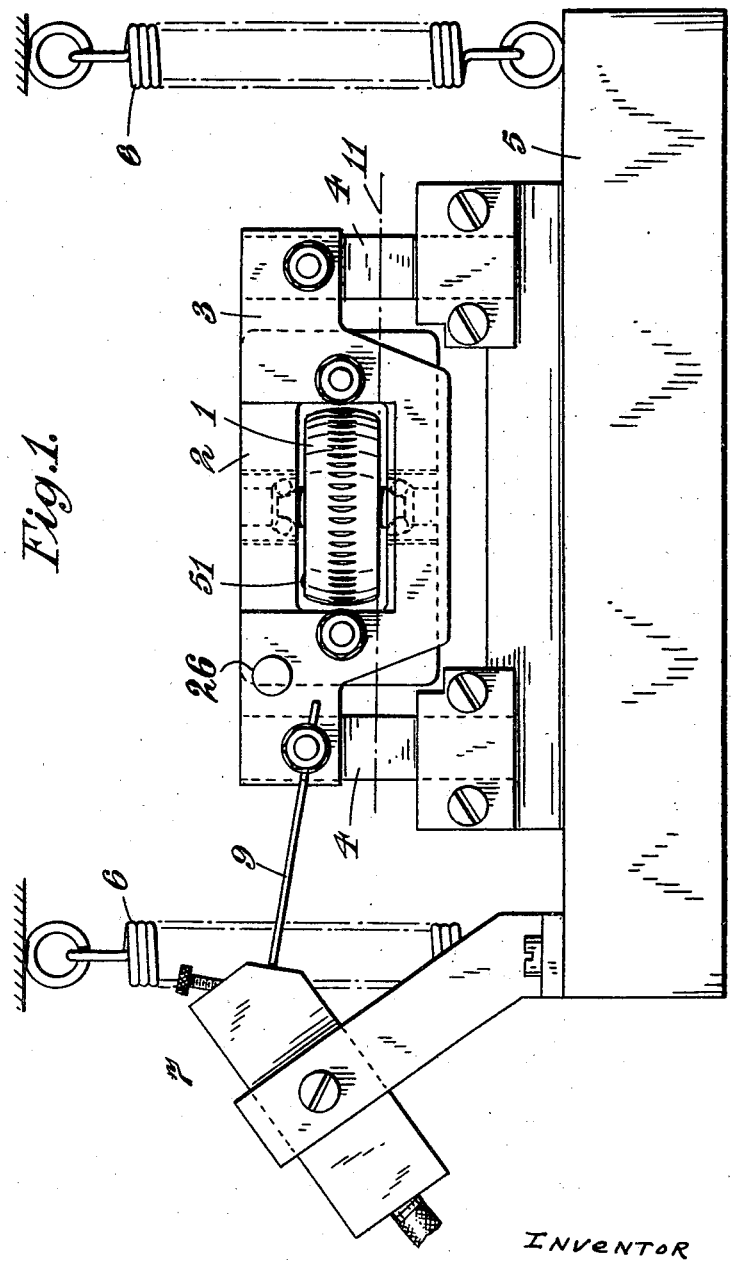
Figure 1 is a side elevation of the resiliently mounted frame for the rotor.
Figure 2:
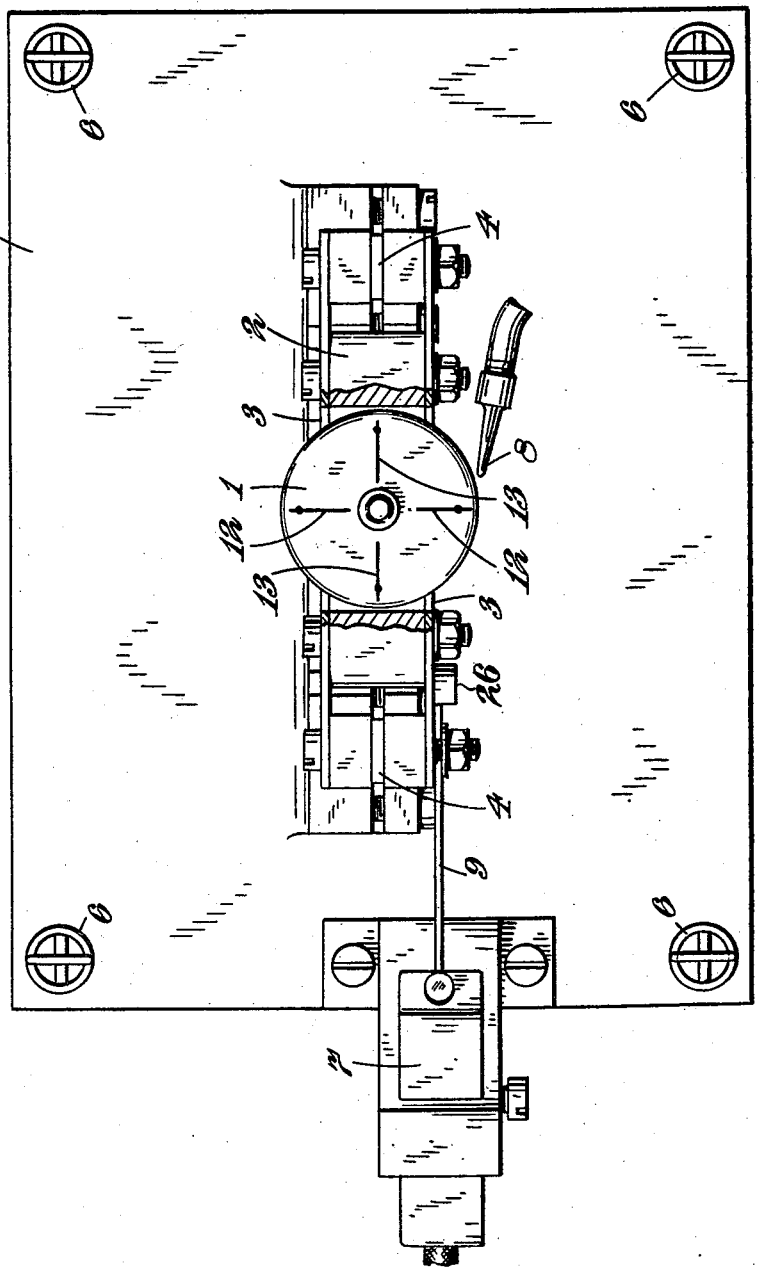
Figure 2 is a plan of the arrangement shown in Figure 1.
Figure 3:
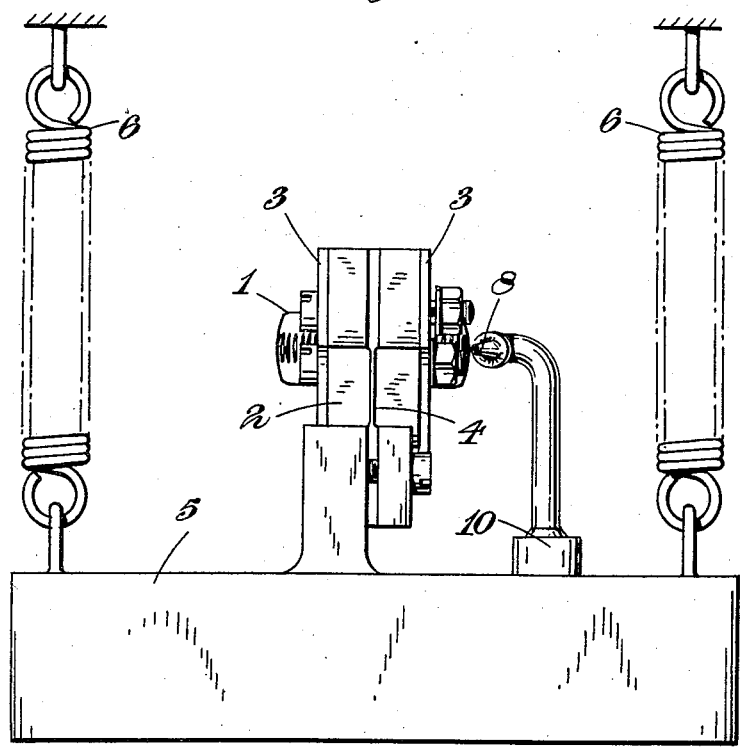
Figure 3 is an end elevation of the arrangement.

Referring to the arrangement shown in Figures 1 to 3, the rotor 1 is mounted in a frame 2 which is either constituted by the ring used for the final gyro assembly or by a special frame. The ring or frame is clamped between suitably shaped plates 3 to which are attached the leaf spring supports 4. These springs are matched in stiffness. The other ends of the spring supports are rigidly mounted on a heavy base 5 which is slung on heavy helical springs 6 from some suitable structural member (such as a roof girder) to ensure that the system is immune from stray vibrations from adjacent machinery, etc.

A gramophone pick-up 7, which may be of the magnetic type, is mounted on the heavy base and is connected to the vibrating system as by the connecting piece 9.

The rotor is driven by an air jet 8 which is swivel mounted at 10 on the base 5.

As will be seen from Figure 1 the rotor is arranged in the frame so that the lower surface of the rotor includes the axis 11 about which the frame vibrates, so that any out-of-balance on this surface of the rotor can have no effect on the frame. On the other surface of the rotor two pairs of index marks 12, 12 and 13, 13 are provided, each pair lying on a line through the spin axis but on opposite sides thereof and equidistant therefrom and the two lines being at right-angles to one another. A small piece of putty 51 is then placed on one of the index marks and the rotor run up by an air jet to above resonance and the air cut off. As the speed falls through resonance the indicator hereinafter described will rise to a maximum reading and this maximum reading is noted. The piece of putty is then put on the opposite index mark and the rotor again run up. As the speed once more falls through resonance the maximum reading is again noted. If two readings are the same the top surface of the rotor is balanced about a line at right-angles to that passing through the first said index marks. In general, however, there will be a difference between the two readings indicating an out-of-balance. A hole is drilled on the mark for which the greater reading was observed, and this hole is progressively increased in size until equal readings are obtained with the putty on the two sides. The two marks at right-angles to the first two are then treated in a similar way to balance the top surface of the rotor about a second axis at right-angles to the first. Finally, the rotor is turned round and the other surface of the rotor is treated in an exactly similar manner.

Figure 4:
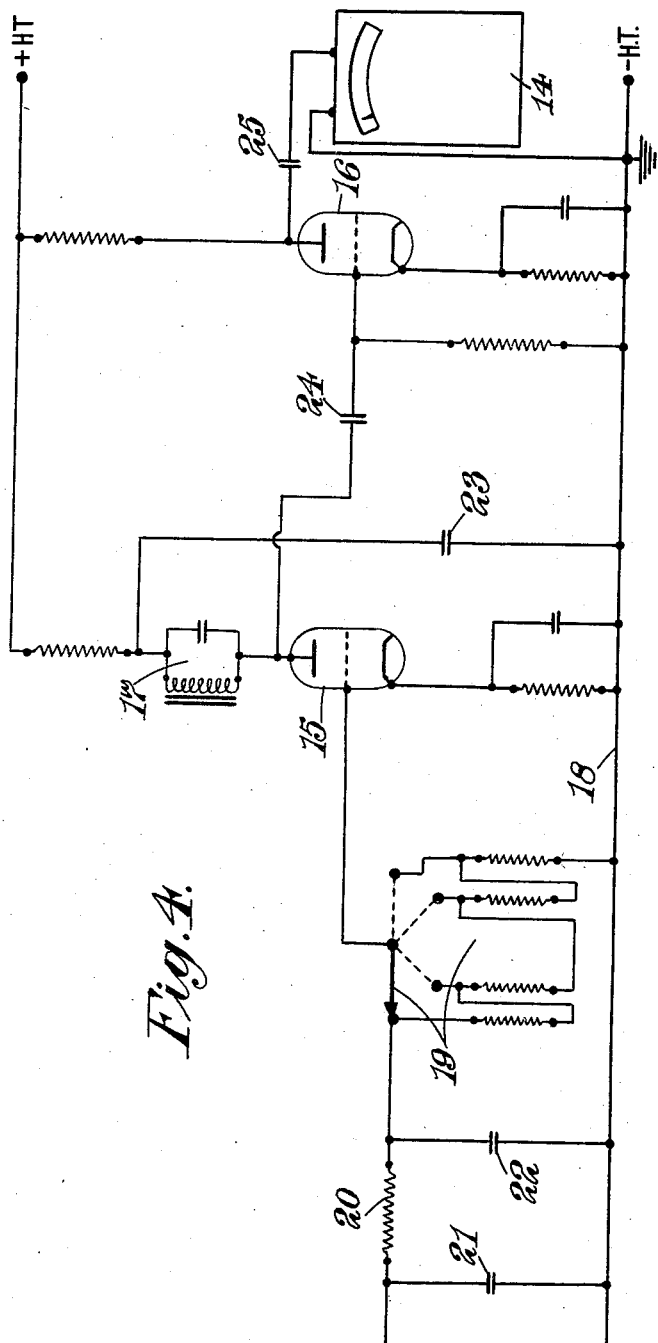
Figure 4 shows an electric circuit for amplifying the electrical impulses generated by a pick-up on the resiliently mounted frame.

As shown in Figure 4, the pick-up 7 is connected in circuit with an indicator 14.

This circuit comprises two electronic valves 15, 16 which are coupled by the tuned circuit 17 tuned to couple the frequency of resonant vibration of the frame from the pickup.

This signal is passed to the amplifier, and reaches the grid of the valve 15 via the filter network 20, 21, 22 and potentiometer sensitivity control 19.

The filter network serves to filter out any unwanted high frequency components of the signal, e. g. due to ball vibration and air turbulence.

Potentiometer 19 controls the signal input to the valve 15 in four graded steps. The sensitivity of the amplifier is selected in accordance with the degree of balancing required.

The anode of the valve 15 is tuned by the resonance circuit 17 and the feed resistance is decoupled by the condenser 23 connected with the earth line.

The signal is passed on to the grid of the electronic valve 16 via the condenser 24. The signal produced in the anode circuit of the valve 16 is passed to the indicator 14, which is connected across the anode-cathode circuit of the valve through the condenser 25.

In practice, it may be difficult to tell when the rotor has been run up above resonance. Thus, if it happens that the piece of putty exactly balances the rotor there will be no vibration of the frame and consequently the indicator will show no resonance. The operator may then think he has not run up the rotor sufficiently and will go on increasing the speed, thereby wasting time.

To overcome this a microphone 26 is arranged to pick up the bucket noise and so generate a current the frequency of which is proportional to rotor speed and the current from the microphone is passed through a band-pass filter associated with a thermionic relay sharply tuned to the frequency of the whistle promoted by the jet and rotor at the resonance frequency of the frame, the relay voltage normally being such that the relay operates on the sharply rising portion of the characteristic of the band-pass filter. The relay is arranged to cut off the supply of air to the driving jet beyond resonance conditions.

Figure 5:
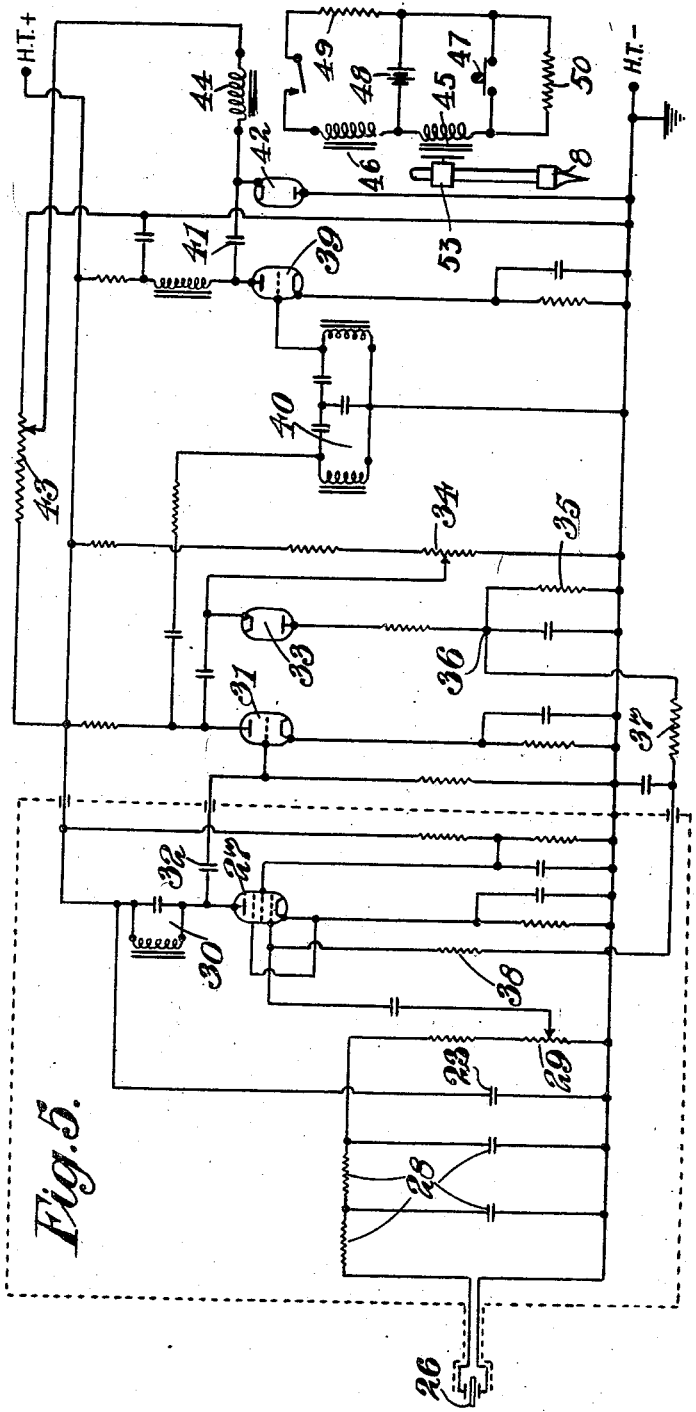
Figure 5 shows an electric circuit for controlling the speed of rotor by means of a microphone responsive to motor noises.

The speed of the rotor is controlled by a crystal microphone and associated circuit shown in Figure 5. The crystal microphone 26 is sensitive to the whistle set up by the driving jet for the rotor.

The circuit comprises a high gain amplifier in which a particular frequency from the crystal microphone due to bucket whistle on the rotor is caused to trip a relay, thereby switching off the air at the selected frequency or rotor speed.

The operation of the circuit is as follows:

The signal from the crystal microphone reaches the grid of the electronic valve 27 through a low pass filter network 28. This filter serves to suppress unwanted high frequencies; the sensitivity of the valve 27 is controlled by a potentiometer 29. The anode circuit of the valve 27 is tuned by a parallel resonance circuit 30. The anode feed resistance is decoupled by a condenser 23.

The signal from the valve 27 is passed to the grid of the valve 31 through the condenser 32 and further amplified.

The signal level on the anode of the valve 31 is controlled by a diode 33 which has its cathode set at a delay voltage dependent on the setting of a potentiometer 34. When the signal level on the anode of the valve 31 exceeds the delay voltage, the diode 33 passes current which causes a voltage drop across a resistance in circuit with the cathode of the diode 33. The negative voltage produced at point 36 is passed via resistors 37 and 38, to the grid of the valve 27, thereby biasing back the grid and giving automatic gain control on this valve. This automatic gain control renders the whole amplifier tolerant to a large variation in the level of the acoustic input.

The controlled signal level at the valve 31 passes on to the electronic valve 39 via a sharply tuned band-pass filter 40.

The signal on the anode of the valve 39 passes via condenser 41 to the cathode of a further diode 42, the cathode being maintained at a positive potential by a tapping on potentiometer 43 taken via a relay winding 44.

It will be appreciated that no direct current flows through the relay winding until the signal level at the valve 39 reaches a sufficient value to back-off the positive relay voltage due to potentiometer 43. When this occurs, the relay action is sharp and rapid. Normally the relay voltage is adjusted so that the relay will operate on the sharp rising portion of the characteristic of the band-pass filter. The jet driving the rotor is controlled through relay mechanism 45, which controls a fluid valve mechanism 53 in circuit with the jet 8.

A switch button 47 is pressed to operate the rotor. This closes the battery circuit via relay winding 45 which relay controls the air supply. Only sufficient current is passed by a resistance 50 to hold relay down after it is actuated, so that button 47 can be pressed and then released.

The rotor will continue to accelerate until the bucket whistle resonates the amplifier and operates relay 44. This relay closes, making the battery circuit 48 via resistance 49 and relay winding 46. The relay 46 is wound in opposition to winding 45 and so cancels the field due to 45, which allows the relay armature to drop out and so switch off the air supply.

By adjustment of the potentiometer 34 controlling the delay voltage on the first diode, the signal level passed to the band-pass filter may be adjusted, thus selecting the frequency at which the relay 44 operates. This adjustment enables the machine setter to set the amplifier so that the air supply to the rotor driving jet is cut off, when the rotor reaches a speed slightly above that required to resonate the balancing frame. In this way, the time lost by the operator in waiting for the rotor speed to resonate the frame may be reduced to a few seconds.

We claim:

1. A method of dynamically balancing a rotor which comprises applying the following procedures in succession to parallel planes of the rotor which are transverse to its axis of rotation: selecting two orthogonal diameters on said plane; balancing the rotor about the first of said diameters by applying a mass first to one point on the second of said diameters and then to another point on that diameter on the opposite side of the axis of rotation of said rotor and at the same distance therefrom as the first point, rotating said rotor after each application of said mass, and measuring the out-of-balance forces during each period of rotation for each application of mass, and thus ascertaining the heavier side, removing material from any point on the heavier side of said plane until the measured out-of-balance forces for said oppositely applied masses are the same; and balancing the rotor about the second of said diameters by repeating the operations with increments placed on the first named diameter, but in this case removing the material from a point lying on said first named diameter.

2. A method of dynamically balancing a rotor which comprises applying the following procedures in succession to parallel planes of the rotor which are transverse to its axis of rotation: applying a temporary adherent mass successively to two points on a line at right angles to a diameter passing through a third point and at equal distances from said diameter, measuring the out-of-balance forces during rotation after each application, adjusting the mass of the rotor itself on said line until the out-of-balance forces in each case are equal; applying a temporary adherent mass successively to said third point and to a fourth point, said third and fourth points being on said diameter at equal distances from the axis of rotation, measuring the out-of-balance forces during rotation in each case, and adjusting the mass of the rotor itself by the addition or removal of mass on said diameter until the out-of-balance forces in each case are equal.

3. An apparatus for balancing a rotor according to the method described, which comprises, in combination, a support, a frame, bearings in said frame rotatably supporting said rotor, means for resiliently mounting said frame in said support so as to be movable in a direction transverse to the rotor axis, driving means for rotating said rotor at varying speeds, speed responsive means for cutting off the driving means for the rotor when the rotor speed exceeds the speed corresponding to resonance of the frame, a magnetic pick-up adapted to be operated by the vibration of said frame, and means for measuring the amplitude of the electrical vibrations generated by said pick-up.

4. An apparatus for balancing a rotor according to the method described, which comprises, in combination, a support, a frame, bearings in said frame rotatably supporting said rotor, means for resiliently mounting said frame in said support so as to be movable in a direction transverse to the rotor axis, driving means for rotating said rotor at varying speeds, speed responsive means for cutting off the driving means for the rotor when the rotor speed exceeds the speed corresponding to resonance of the frame, a magnetic pick-up adapted to be operated by the vibration of said frame, means for measuring the amplitude of the electrical vibrations generated by said pick-up, and filters in said pick-up circuit to filter out unwanted vibrations.

5. An apparatus for balancing a rotor according to the method described, which comprises, in combination, a support, a frame, bearings in said frame rotatably supporting said rotor, means for resiliently mounting said frame in said support so as to be movable in a direction transverse to the rotor axis, driving means for rotating said rotor at speeds up to and slightly beyond the speed corresponding to the natural period of vibration of the resiliently mounted oscillating frame, a microphone responsive to the sound vibrations set up by the driving means at said speed, an electrical circuit containing said microphone, a band-pass filter in said circuit sharply tuned to said vibrations corresponding to the frame resonance, a source of current supply for the rotor driving means, a relay in said circuit adapted to control said supply to the rotor driving means, means providing relay voltage such that the relay operates on the sharply rising portion of the characteristics of the bandpass filter, whereby the current supply for the rotor is cut off at a speed corresponding to the resonance of the frame.

6. A method of dynamically balancing a rotor which comprises applying the following procedures in succession to each of two parallel planes of the rotor which are transverse to the axis of rotation: temporarily adjusting the mass of the rotor in the given plane at an arbitrary point, rotating the rotor in a frame adapted to measure the out-of-balance forces and noting said out-of-balance force, temporarily adjusting the mass of the rotor to a similar extent at a point an equal distance on the diametrically opposite side of the spin axis to the first point, similarly rotating the rotor in said frame as in the first step and noting said out-of-balance force, permanently adjusting the mass of the rotor on a line joining said two points so that successive similar temporary adjustments at said points result in equal out-of-balance forces; and repeating this procedure on a line normal to the first said line and passing through the spin axis.

7. A method of dynamically balancing a rotor which comprises applying the following procedures in succession to each of two parallel planes of the rotor which are transverse to the axis of rotation: temporarily adjusting the mass of the rotor in the given plane at an arbitrary point, rotating the rotor in a resiliently-mounted frame at a speed at which resonance takes place, noting the amplitude of vibration at this speed, temporarily adjusting the mass of the rotor to a similar extent at a point an equal distance on the diametrically opposite side of the spin axis to the first, again rotating the rotor at a speed at which resonance takes place, noting the amplitude of vibration, permanently adjusting the mass of the rotor on a line joining said two points so that successive temporary similar adjustments at said points result in equal amplitudes of vibration at resonance speeds; and repeating this procedure on a line normal to the first said line and passing through the spin axis.

8. A method of dynamically balancing a rotor according to claim 2, in which the rotor is so rotatably mounted that it is resiliently movable in direction transverse to the rotor axis and, after the application of the temporary mass to each of said four points, rotating the rotor to a given range of speed, including a speed corresponding to the natural period of vibration of the resilient mounting of the rotor, and in which the measuring of the out-of-balance forces includes measuring the maximum amplitude of vibration after the application of the temporary mass to the first two points, and in which the adjusting of the mass of the rotor at one of said points is so effected as to equalize the two maximum amplitudes of vibration, and likewise measuring the maximum amplitude of vibration after successive applications of the temporary mass to the third and fourth points and altering the amount of material of the rotor at one of those points to equalize the maximum amplitudes of vibration.

9. A method of dynamically balancing a rotor according to claim 2, in which said rotor is so rotatably mounted that it may oscillate about an axis at right angles to that of the rotor and passing through one of said planes and, after the application of the temporary mass to each of said four points, rotating the rotor to a given range of speed, including a speed corresponding to the natural period of vibration of the resilient mounting of the rotor, and in which the measuring of the out-of-balance forces includes measuring the maximum amplitude of vibration after the application of the temporary mass to the first two points, and in which the adjusting of the mass of the rotor at one of said points is so effected as to equalize the two maximum amplitudes of vibration, and likewise measuring the maximum amplitude of vibration after successive applications of the temporary mass to the third and fourth points and altering the amount of material of the rotor at one of those points to equalize the maximum amplitudes of vibration.

10. A method of dynamically balancing a rotor which comprises applying the following procedures in succession to each of two parallel planes of the rotor which are transverse to the axis of rotation: temporarily adjusting the mass of the rotor in the given plane at an arbitrary point lying to one side of a diameter, rotating the rotor in a frame adapted to measure the out-of-balance forces and noting said out-of-balance force, temporarily adjusting the mass of the rotor to a similar extent at a second point which lies on a line normal to said diameter and passing through the first point, the second point being at the same distance from said diameter as the first point, similarly rotating the rotor in said frame as in the first step and noting said out-of-balance force, permanently adjusting the mass of the rotor at a point not on said diameter so that successive similar temporary adjustments at the first and second points result in equal out-of-balance forces; and repeating this procedure by temporarily adjusting the mass at points on said diameter at equal distances from the spin axis, and subsequently permanently adjusting the mass at a point on said diameter.

11. An apparatus for balancing a rotor according to the method described which comprises, in combination, a support, a frame, bearings in said frame upon which said rotor rotates on an axis substantially perpendicular to said support, two leaf springs arranged on opposite sides of the rotor axis, extending substantially parallel to and lying in the same plane therewith, opposite ends of said springs being secured respectively to the support and said frame, the two springs constituting the sole means for supporting the said frame, and whereby the oscillation of said frame is substantially limited to rocking movement about a single axis transverse to the rotor axis, said rocking axis being substantially in the same plane as one end face of the rotor, means for rotating said rotor at varying speeds, a magnetic pick-up operated by the vibration of said frame about said single axis and means operatively connected with said pick-up for measuring the amplitude of the electrical vibrations generated by said pick-up at a given speed of rotation of said rotor.

FREDERICK WILLIAM MEREDITH.
ERIC BEECROFT MOSS.
HUBERT EDWARD WHATLEY.

(References on following page)

REFERENCES CITED

The following references are of record in the file of this patent:

UNITED STATES PATENTS

| Number | Name | Date |
|---|---|---|
| 710,148 | Hodgkinson | Sept. 30, 1902 |
| 811,678 | Waters | Feb. 6, 1906 |
| 989,043 | Pohl | Apr. 11, 1911 |
| 1,009,323 | Lincoln et al. | Nov. 21, 1911 |
| 1,490,109 | Hort | Apr. 15, 1924 |
| 1,547,487 | Allen | July 28, 1925 |
| 1,557,268 | Newkirk | Oct. 13, 1925 |
| 1,678,888 | Trumpler | July 31, 1928 |
| 1,774,718 | McCabe | Sept. 2, 1930 |
| 1,801,989 | Wells et al. | Apr. 21, 1931 |
| 2,243,458 | Esval et al. | May 27, 1941 |
| 2,289,074 | Rushing et al. | July 7, 1942 |
| 2,348,922 | Pekar | May 16, 1944 |

OTHER REFERENCES

"Vibration Problems in Engineering," by S. Timoshenko, second printing, pgs. 38 through 41. Published by D. Van Nostrand Co., Inc., 250 Fourth Ave., New York, N. Y. (A copy is in Div. 36.)